(12) United States Patent
Cormack

(10) Patent No.: US 6,362,904 B1
(45) Date of Patent: Mar. 26, 2002

(54) TUNABLE OPTICAL FILTER WITH RETAINED COMPLEMENTARY OUTPUT

(76) Inventor: Robert H. Cormack, 5305 Holmes Pl., Boulder, CO (US) 80303

(*) Notice: Subject to any disclaimer, the term of this patent is extended or adjusted under 35 U.S.C. 154(b) by 0 days.

(21) Appl. No.: 09/716,882

(22) Filed: Nov. 20, 2000

Related U.S. Application Data

(60) Provisional application No. 60/230,180, filed on Sep. 1, 2000, and provisional application No. 60/231,109, filed on Sep. 8, 2000.

(51) Int. Cl.[7] ............................................... H04J 14/02
(52) U.S. Cl. ........................ 359/127; 359/529; 385/24
(58) Field of Search ................. 385/15, 24–25; 359/127–128, 529–533

(56) References Cited

U.S. PATENT DOCUMENTS

| | | | |
|---|---|---|---|
| 4,813,756 A | 3/1989 | Fenkel et al. | 350/96.18 |
| 5,193,027 A | 3/1993 | Preston | 359/566 |
| 5,481,402 A | 1/1996 | Cheng et al. | 359/498 |
| 5,504,608 A | 4/1996 | Neeves et al. | 359/124 |
| 5,812,291 A | 9/1998 | Bendelli et al. | 359/129 |
| 5,917,626 A | 6/1999 | Lee | 359/131 |
| 5,949,801 A | 9/1999 | Tayebati | 372/20 |
| 6,040,944 A | 3/2000 | Pan et al. | 359/590 |
| 6,088,166 A | 7/2000 | Lee | 359/654 |
| 6,122,301 A | 9/2000 | Tei et al. | 372/32 |

FOREIGN PATENT DOCUMENTS

| | | | |
|---|---|---|---|
| JP | 10324037 | 5/2000 | G02B/5/28 |

OTHER PUBLICATIONS

Haschberger et al., "Michelson Interferometer with a rotating retroreflector" Applied Optics vol.29: No. 28 (Oct. 1, 1990, p. 4216).

*Primary Examiner*—Rodney Bovernick
*Assistant Examiner*—Jerry T Rahll
(74) *Attorney, Agent, or Firm*—Jennifer L. Bales; Macheldt Bales LLP

(57) ABSTRACT

A tunable interference add/drop filter system combines an interference filter or the like with a mirror attached adjacent to the filter at an angle under 180° to form a reflector assembly. The reflector assembly is rotated to tune the filter system. The dropped output passes through the filter, while the passed output reflects off of the filter and the mirror. The direction of the passed output beam is a fixed angle from the input beam, and the beam is translated sideways by a fixed amount, no matter how much the reflector assembly is rotated. Thus the dropped output (or complementary output) can be retained. A null state switch prevents light from reaching the filter while the filter system is tuning.

13 Claims, 4 Drawing Sheets

US 6,362,904 B1

TUNABLE OPTICAL FILTER WITH RETAINED COMPLEMENTARY OUTPUT

BACKGROUND OF THE INVENTION

This application claims the benefit of U.S. Provisional Patent Application No. 60/230,180, filed Sep. 1, 2000, and U.S. Provisional Patent Application No. 60/231,109, filed Sep. 8, 2000.

FIELD OF THE INVENTION

The present invention relates to tunable optical filters having retained complementary outputs.

DESCRIPTION OF THE PRIOR ART

Optical fiber wavelength division multiplexed (WDM) communications systems are theoretically capable of extremely high data rates (terabits per second), meaning that many channels of gigabit rate data can theoretically be carried on a fiber, via wavelength division multiplexing.

Currently the two methods of constructing nodes on a fiber network are Optical to Electronic to Optical (OEO) conversion and fixed optical add/drop filters. OEO is the most common method, but is very expensive. The signals which are not being dropped are used to modulate lasers and the resulting wavelengths are multiplexed back in. Much of the hardware is data rate dependant.

Fixed optical add/drop nodes are simpler and less expensive, but must be replaced when any change is made. In addition, certain paths through the network are blocked from use, as no single wavelength can connect them, If the network is manually configured to remove a given block, another blocked path is inevitably created. This problem grows rapidly with increasing network complexity.

The utility of fiber optic systems has been limited because a truly useful optical tunable add/drop filter requires four characteristics:

1) Flat-topped pass bands, so that the modulation sidebands of the signal (where all of the information resides) are not attenuated;
2) Accurate tunability;
3) Retaining of the complementary output so the filter can add and drop; and
4) A switchable null/all-pass state, such that a filter can be switched into the all pass state, tuned to a different wavelength, and switched back to add/drop mode, all without interrupting, even momentarily, the continuity of other wavelengths passing through the filter and switch.

Currently, optical add/drop filters lacking at least one of the above characteristics are used to extract desired frequencies. FIG. 1 (prior art) shows a conventional fixed-wavelength optical add/drop filter system 100, based on a thin-film interference filter 108. FIG. 2 (prior art) shows the frequencies transmitted and reflected by filter 108 of FIG. 1.

Interference filters are a relatively inexpensive, mature technology. It is common to get flat-topped pass-bands and channel spacings down to 100 GHz (0.8 nm, in the 1550 nm communications band). Interestingly, interference filters can theoretically be tuned across a significant bandwidth by changing the angle of incidence of the light striking the filter. The limitation preventing the interference filter system 100 from being both tuned (rotated) and used as add/drop filter is the great difficulty of tracking the reflected output 106 (at Port B) as the filter is rotated. As a result, no tunable interference filters offer complimentary outputs 106—only the output 104 that passes through filter 108 is kept and the rest of the light is dissipated. Thus, despite the advantageous features of interference filters (low cost, flat passband shape, ready availability) commercial tunable add/drop filters have not yet been based on this technology.

Thus, filters with appropriately flat-topped pass bands (such as thin film interference filters) either are not tunable or, if tunable, do not have complementary outputs. Other tunable filter technologies, such as acousto-optic filters and Fabre-Perot filters cannot be constructed with flat-topped pass bands. No prior art filter design has satisfactorily dealt with the requirement for a switchable null/all-pass state for noninterference.

A need remains in the art for tunable drop filters and add/drop filters which retain the complementary output and have flat topped pass bands for use in WDM communication systems.

SUMMARY OF THE INVENTION

An object of the invention is to provide tunable drop filters and add/drop filters which retain the complementary output and have flat topped pass bands for use in WDM communication systems.

A tunable drop filter system according to the present invention includes some sort of tunable filter (thin film biregringent, holographic Bragg grating, beamsplitter, interference thin film) to divide the input beam into a dropped beam and a passed beam. A mirror is placed adjacent to the filter, such that their extended planes have a dihedral angle of less than 180°, and the input beam is directed at the filter such that the portion of the beam reflecting off the filter also reflects off the mirror. The passed beam, then, reflects off of the filter and the mirror and is directed to a fixed location, and the dropped beam passes through the filter. The filter is tuned by rotating the filter/mirror assembly around an axis formed where their extended planes meet.

For example, a tunable add/drop filter system for dividing an input beam into a dropped beam and a passed beam could comprise an interference filter and a mirror placed at an angle under 180° to the filter to form a reflector assembly. The reflector assembly is rotatable about the vertex of the assembly angle, to tune the filter.

The input beam is directed such that the portion of the input beam that reflects off of the interference filter reflects off of the mirror. In this filter system, the dropped output passes through the filter, and the passed output reflects off of the filter and the mirror at a fixed angle from the input beam. The passed output beam is translated sideways from the input beam by a fixed amount regardless of the rotation of the reflector assembly.

DETAILED DESCRIPTION OF THE PREFERRED EMBODIMENTS

The present invention teaches how to obtain complementary outputs from a tunable (by rotation) interference filter or the like, thus allowing the filter to be used as a tunable add/drop filter. In addition, the invention shows how to add a switchable null state (all wavelength pass) to the filter so that it can tune between non-adjacent wavelengths without interrupting the wavelengths in between. This is a critical requirement for a commercially useful tunable add/drop filter.

Figure 1:
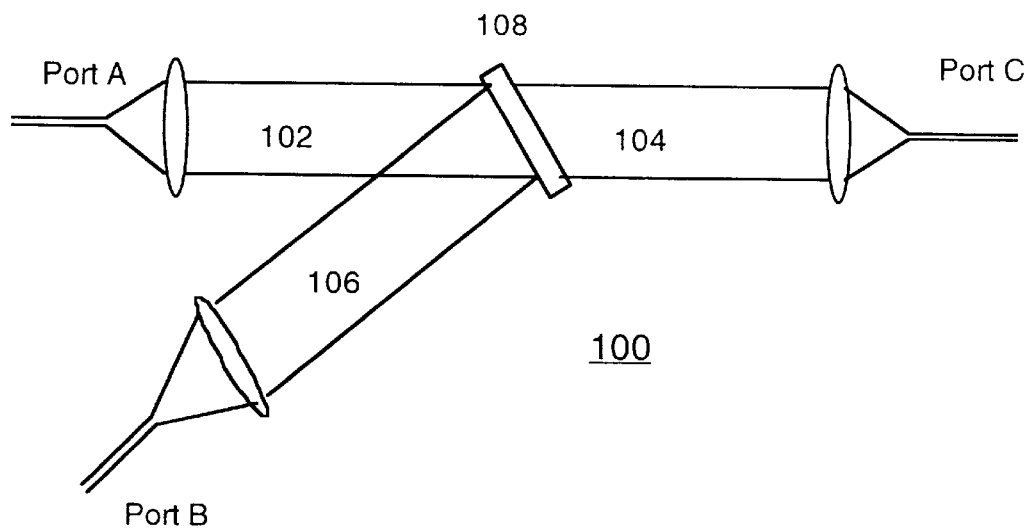
FIG. 1 (prior art) shows a conventional tunable optical filter system based on an interference filter.
Figure 2:
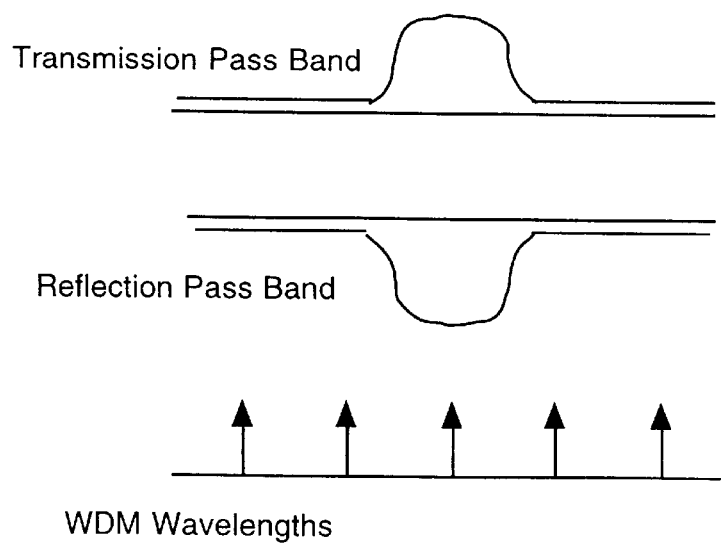
FIG. 2 (prior art) shows the frequencies transmitted and reflected by the filter of FIG. 1.
Figure 3:
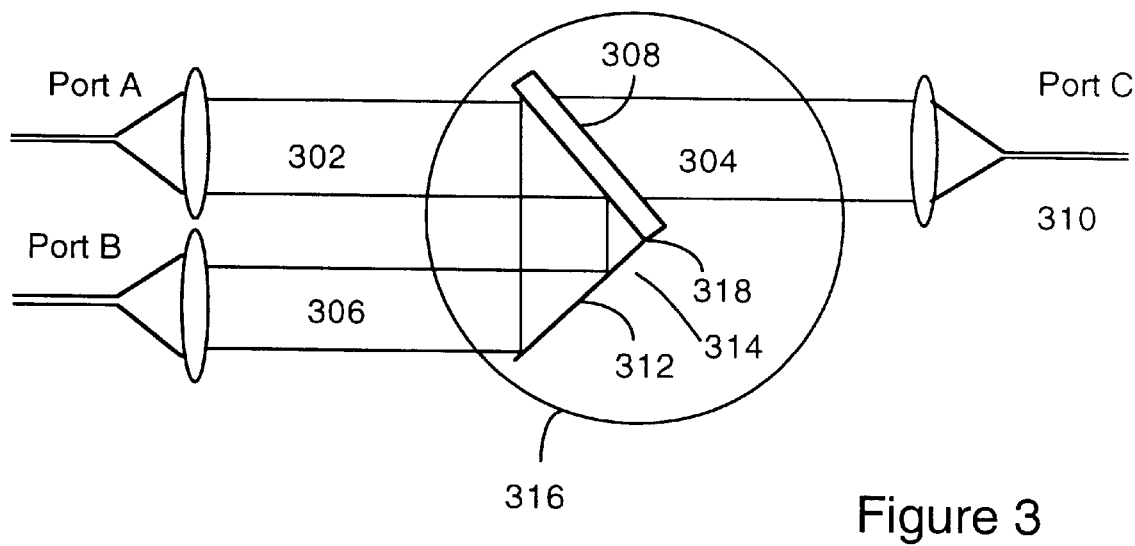
FIG. 3 shows a block diagram of an improved tunable add/drop interference filter system according to the present invention.

FIG. 3 shows a block diagram of an improved tunable drop interference filter system 300 according to the present invention, For clarity, the input 302 is assumed to be polarized. If unpolarized light is input, the polarization-diversity techniques in the known art can be used: i.e., separate the polarizations into parallel beams, rotate one of the beams so that both beams share the same polarization, and then pass both beams through the filter together as if they were just a single, larger beam. At the outputs, the steps are reversed to recombine the beams.

Figure 7:
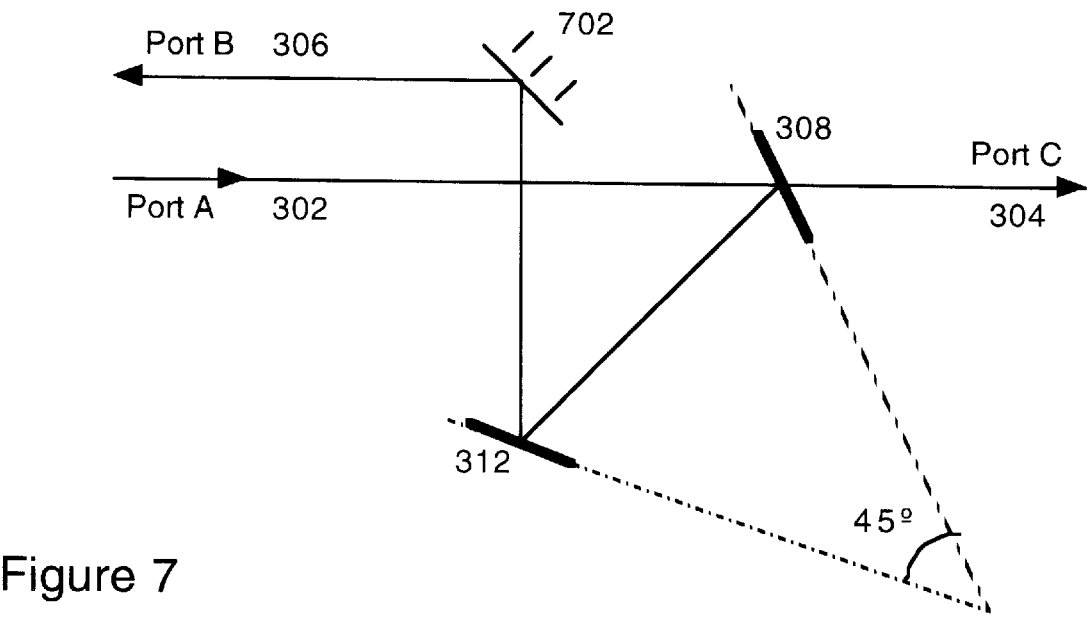
FIG. 7 shows a third embodiment of a tunable add/drop filter system according to the present invention, wherein the reflector assembly forms an acute angle for use at low angle of incidence input beams.

Interference filter 308 is combined with a mirror 312 at right angles to filter 308 so as to form a reflector assembly 314. Note that filter 308 and mirror 312 can be oriented at any angle under 180°, so long as the input beam can reflect off of the filter and the reflected portion then reflects off of the mirror. FIG. 7 illustrates such an orientation. In addition, filter 308 and mirror 312 do not need to be joined at the apex of their extended planes, so long as they rotate around an axis located there.

In FIG. 3, filter-mirror combination 314 is mounted on a turntable 316 with the vertex of the corner at the center of rotation 318. In FIG. 3, light 302 is input at port (A). The dropped output 304 is transmitted through interference filter 308 to port (C), while the passed output 306 is reflected from both interference filter 308 and mirror 312, such that the direction of output beam 306 is changed by 180° and translated sideways from input beam 302. The output beam is then focused into pass output port (B).

Note that FIG. 3 also illustrates a tunable add filter. In this case, Port C is the add port.

Figure 4:
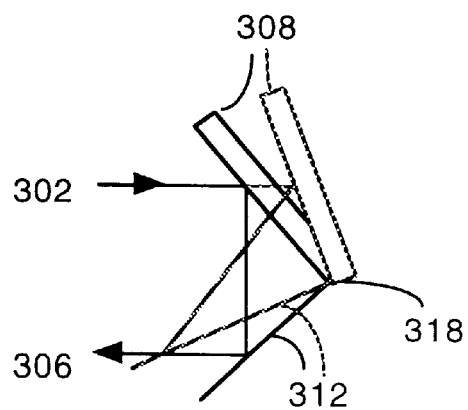
FIG. 4 illustrates the reflection path of the filter of FIG. 3.
Figure 8:
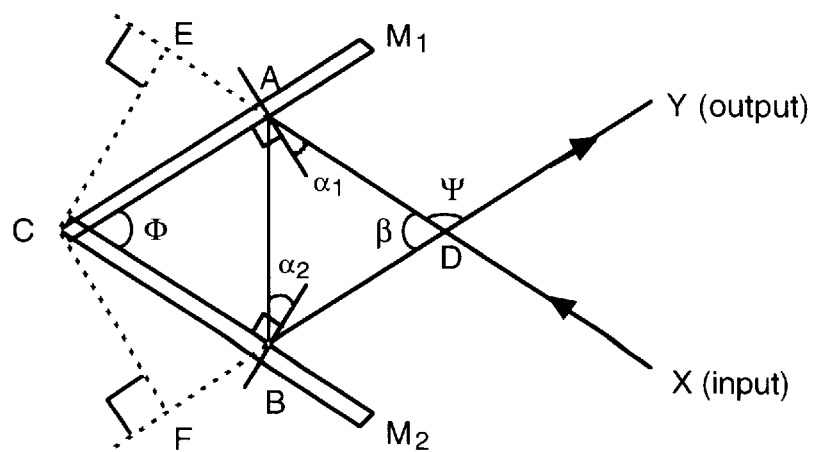
FIG. 8 illustrates the reflection path shown in FIG. 4, for random input angles.

FIG. 4 illustrates the reflection path of the filter of FIG. 3. It shows the details of what happens when turntable 316 is rotated. For both positions of turntable 316 shown, output beam 306 remains stationary. This is illustrated in FIGS. 7 and 8. Due to the properties of an open reflector assembly (i.e., no refracting materials, only reflections), output beam 306 will remain stationary for all positions of turntable 316 where the beam does not miss filter 308 or mirror 312. In order to achieve a large range of angles, interference filter 308 should be fabricated such that the center wavelength is achieved with the filter at approximately 450 to the beam. This is not a problem, since the filter doesn't need to be polarization independent.

Figure 5:
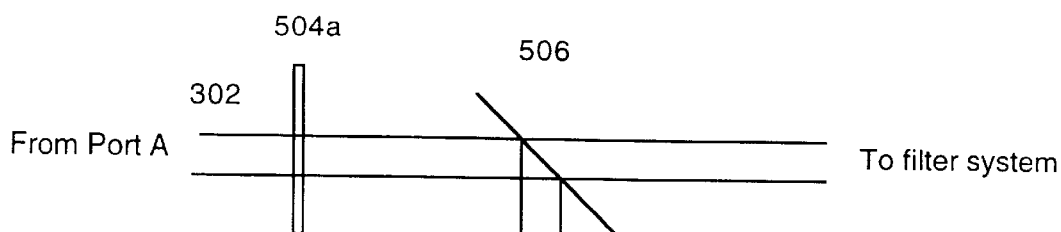
FIG. 5 shows a null-state switch for use with the filter system of FIG. 3.
Figure 5:
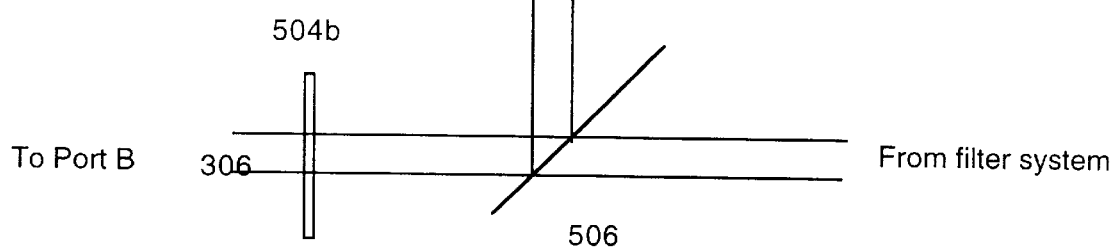

FIG. 5 shows a null-state switch 500 for use with the filter of FIG. 3. This switch is positioned where the beam is of uniform polarization (i.e., after polarization splitting and rotation, if used).

Figure 6:
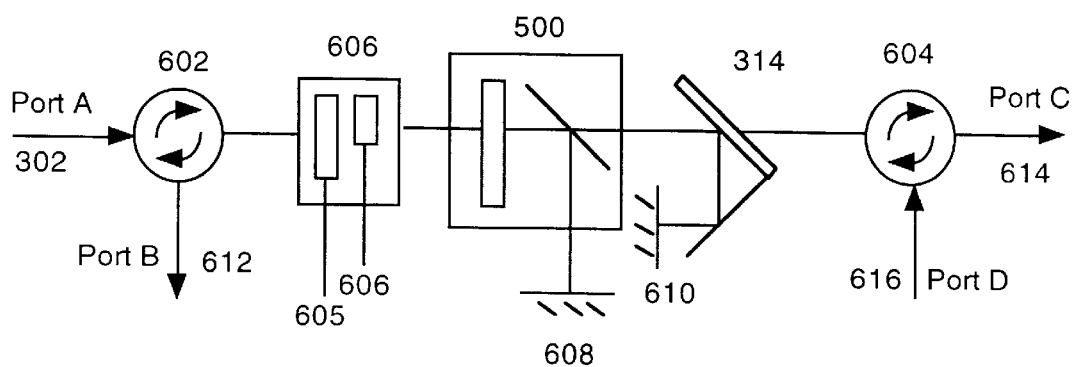
FIG. 6 shows a second embodiment of a tunable add/drop filter system according to the present invention, including elements allowing simultaneous dropping and adding of a wavelength.
Figure 6:
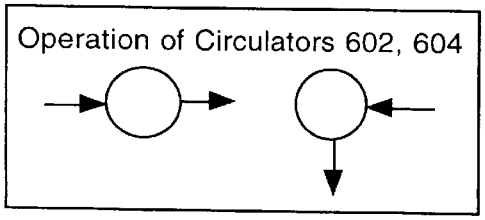

So, in the case where beam 302 is not already polarized, it must be passed through a polarization block such as block 606 in FIG. 6.

Each switchable polarization rotator 504 can be any style of variable retarder (liquid-crystal cell, Babinet compensator, etc.), or simply a half-wave retarder plate that is rotated to the appropriate angle when polarization rotation is desired. The polarizing beam splitters (pbs) 506 are aligned so that, if the polarization is not rotated, the light passes through to the filter from port (A) and back from the filter to port (B). When the polarization of the beams is rotated by 90°, then the light is reflected from each pbs and takes a bypass route, cutting out the filter. The second polarization rotation 504b, before port (B), is necessary to restore the beam's original polarization so that any polarization beam-combining into port (B) will work as designed.

The operation of the null-state switch 500 is a follows: as the polarization of beam 302 is rotated by switchable rotators 504, the light path smoothly changes from through pbs 506a (to the filter) to the bypass route (no light transmitted to the filter). When the rotation is complete, filter 308 is removed from the light circuit (i.e., is in the null state), and can then proceed to tune across the band without the danger of temporarily interrupting service on the signals it tunes across.

While the switch is changing, light temporarily travels two paths through the device - through the filter and through the bypass route. To insure that no wavelengths are attenuated by destructive interference during the switching operation, the bypass route preferably is constructed to have the same optical path length as the light path through the filter. This is feasible, since the optical path length through the filter is a constant, independent of the rotational position of the filter-mirror assembly.

FIG. 6 shows a tunable add/drop filter system 600 according to the present invention, including circulators 602, 604 allowing simultaneous dropping and adding of a wavelength. Circulator 602 operates to provide the reflected pass output (306 in FIG. 3) and add-in beam 616 at port B as pass+add signal 612. Mirror 610 reflects the pass beam.

Circulator 604 operates to add signal 616 and drop signal 614. As shown in FIG. 6, signals coming into circulator 604 via Port A (such as signal 302) are passed straight through to the filter system, and signals returning from the filter system to circulator 604 from the left are routed down to Port B.

Mirror 608, combined with null state switch 500, acts to isolate the filter from the input fiber while the filter is tuned between frequencies (as described with respect to FIG. 5).

Polarization block 606 comprises a birefringent block 605 or the like which spatially separates the two polarizations of the input beam, and a beam rotator 607 used to rotate one of them 90° to align with the other. The two beams now have the same polarization, and so long as they are close together, they may be treated as one beam throughout system 600. After processing, the polarization process can be reversed by rotating one of the beams 90° and recombining the beams.

To avoid introducing different transmission delays on the two polarizations as the beams pass through the filter, the preferred technique is to insure that both beams are subject to the same combination of delays. For example, the beam which traverses the slow axis of the polarization splitter at the input port, generally should pass through the fast axis of the polarization combiners as the exit ports. Likewise, the beam which passes through the polarization rotator in the entrance port generally should not be the beam rotated in the exit ports. Arranging for the same path length for each beam is achievable through well known techniques in the art, and prevents the filter from introducing unnecessary polarization mode dispersion (PMD) into the optical signals.

FIG. 7 shows a third embodiment of a tunable add/drop filter 700 according to the present invention, wherein the reflector assembly forms an acute angle for use at low angles of incidence.

In the example of FIG. 7, the assembly angle is 45°, which is a particularly useful angle since the passed beam is emitted at an angle 90° from the input beam.

FIG. 8 illustrates the reflection path shown in FIG. 4, for random input angles.

What is claimed is:

1. A tunable drop filter system for dividing an input beam into a dropped beam and a passed beam comprising:
   a filter of the type which reflects a pass signal and transmits a drop signal according to frequency, tunable by rotation with respect to the input beam;
   a mirror affixed adjacent to the filter, wherein the fixed angle formed by the plane of the filter and the plane of the mirror is under 180°, the mirror and the filter forming a reflector assembly;
   means for directing the input beam such that the portion of the input beam that reflects off of the interference filter reflects off of the mirror; and
   means for rotating the reflector assembly about an axis at the vertex of the plane of the filter and the plane of the mirror;
   wherein the dropped output passes through the filter, and the passed output reflects off of the filter and the mirror at a fixed angle from the input beam, wherein the system is tuned by rotating the reflector assembly, and wherein the passed output beam is translated sideways from the input beam by a fixed amount regardless of the rotation of the filter assembly.

2. The apparatus of claim 1 wherein the filter is an interference filter.

3. The apparatus of claim 1, further including a null state/all-pass element comprising:
   a first switchable polarization rotator between port A and the filter system;
   a first polarizing beam splitter between the first rotator and the filter system;
   a second switchable polarization rotator between the filter system and port B; and
   a second polarizing beam splitter between the filter system and the second rotator;
   wherein the polarizing beam splitters are aligned such that, if the switchable polarization rotators do not rotate, light passes from port (A) through to the filter system and back from the filter system to port (B), and when the switchable polarization rotators do rotate by 90°, light is reflected from the first polarizing beam splitter to the second polarizing beam splitter and from the second polarizing beam splitter to port B, thereby cutting out the filter.

4. The apparatus of claim 1, wherein the input beam is unpolarized, and further including a polarizing block between port A and the filter system including an element for spatially separating the two polarizations of the input beam and a rotator for rotating the polarization of one beam by 90°, such that the polarization of both beams is the same.

5. The apparatus of claim 1, wherein the angle formed by the plane of the filter and the plane of the mirror is approximately 90°.

6. The apparatus of claim 1, wherein the angle formed by the plane of the filter and the plane of the mirror is approximately 45°.

7. A tunable add/drop filter system for dividing an input beam at port A into a dropped beam at port C and a passed beam at port B, and replacing the dropped beam with an add beam of the same base frequency at port D, the filter system comprising:
   a filter of the type which reflects a pass signal and transmits a drop signal according to frequency, tunable by rotation with respect to the input beam;
   a circulator between port A and the filter for passing light from port A to the filter and light from the filter to port B;
   a first mirror affixed adjacent to the filter, wherein the fixed angle formed by the plane of the filter and the plane of the mirror is under 180°, the mirror and the filter forming a reflector assembly;
   means for directing the input beam such that the portion of the input beam that reflects off of the interference filter reflects off of the first mirror;
   a second mirror adjacent to the first mirror for reflecting light from the first mirror back along the same path;
   a second circulator for passing light from the filter to port C, and light from port D to the filter; and
   means for rotating the reflector assembly about an axis at the vertex of the plane of the filter and the plane of the mirror to tune the filter;
   wherein the dropped output passes through the filter to port C, the passed output reflects off of the filter and the first and second mirrors and is returned to port A, and the add signal is passed from port D back to port A.

8. The apparatus of claim 7 wherein the filter is an interference filter.

9. The apparatus of claim 7, further including a null state/all-pass element comprising:
   a first switchable polarization rotator between port A and the filter system;
   a first polarizing beam splitter between the first rotator and the filter system;
   a second switchable polarization rotator between the filter system and port B; and
   a second polarizing beam splitter between the filter system and the second rotator;
   wherein the polarizing beam splitters are aligned such that, if the switchable polarization rotators do not rotate, light passes from port (A) through to the filter system and back from the filter system to port (B), and when the switchable polarization rotators do rotate by 90°, light is reflected from the first polarizing beam splitter to the second polarizing beam splitter and from the second polarizing beam splitter to port B, thereby cutting out the filter.

10. The apparatus of claim 7, wherein the input beam is unpolarized, and further including a polarizing block between port A and the filter system including an element for spatially separating the two polarizations of the input beam and a rotator for rotating the polarization of one beam by 90°, such that the polarization of both beams is the same.

11. The apparatus of claim 7, wherein the angle formed by the plane of the filter and the plane of the mirror is approximately 90°.

12. The apparatus of claim 7, wherein the angle formed by the plane of the filter and the plane of the mirror is approximately 45°.

13. A tunable add filter system for dividing an input beam into an added beam and a passed beam comprising:
   a filter of the type which reflects a pass signal and transmits an add signal according to frequency, tunable by rotation with respect to the input beam;
   a mirror affixed adjacent to the filter, wherein the fixed angle formed by the plane of the filter and the plane of the mirror is under 180°, the mirror and the filter forming a reflector assembly;
   means for directing the input beam such that the portion of the input beam that reflects off of the interference filter reflects off of the mirror; and
   means for rotating the reflector assembly about an axis at the vertex of the plane of the filter and the plane of the mirror;
   wherein the added output passes through the filter, and the passed output reflects off of the filter and the mirror at a fixed angle from the input beam, wherein the system is tuned by rotating the reflector assembly, and wherein the passed output beam is translated sideways from the input beam by a fixed amount regardless of the rotation of the filter assembly.

* * * * *